(12) United States Patent
Niitani (10) Patent No.: US 8,961,080 B2
(45) Date of Patent: Feb. 24, 2015

(54) BORING TOOL

(75) Inventor: Haruhiko Niitani, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 492 days.

(21) Appl. No.: 13/502,046

(22) PCT Filed: Aug. 23, 2010

(86) PCT No.: PCT/JP2010/064138
§ 371 (c)(1), (2), (4) Date: May 17, 2012

(87) PCT Pub. No.: WO2011/045980
PCT Pub. Date: Apr. 21, 2011

(65) Prior Publication Data
US 2012/0237307 A1    Sep. 20, 2012

(30) Foreign Application Priority Data

Oct. 16, 2009    (JP) ................................ 2009-238891

(51) Int. Cl.
*B23B 29/02* (2006.01)

(52) U.S. Cl.
CPC ............... *B23B 29/02* (2013.01); *B23B 29/027* (2013.01); *B23B 2215/24* (2013.01); *B23B 2222/28* (2013.01); *B23B 2226/275* (2013.01);
(Continued)

(58) Field of Classification Search
CPC ...................................................... B23B 29/02
USPC ........................... 408/238, 239 R, 239 A, 708
See application file for complete search history.

(56) References Cited

U.S. PATENT DOCUMENTS

| | | | |
|---|---|---|---|
| 4,998,851 A | * | 3/1991 | Hunt ............................ 408/143 |
| 5,865,571 A | | 2/1999 | Tankala et al. |
| 6,076,999 A | | 6/2000 | Hedberg et al. |

(Continued)

FOREIGN PATENT DOCUMENTS

| | | |
|---|---|---|
| CN | 86 2 09970 U | 11/1987 |
| CN | 1260741 A | 7/2000 |

(Continued)

OTHER PUBLICATIONS

Office Action mailed Jul. 1, 2013 for related Chinese Application No. 201080046607.03 with an English translation.

(Continued)

*Primary Examiner* — Daniel Howell
*Assistant Examiner* — Nicole N Ramos
(74) *Attorney, Agent, or Firm* — Birch, Stewart, Kolasch & Birch, LLP (57) ABSTRACT

Provided is a boring tool which not only is lightweight but also has both abrasion resistance and high stiffness. More specifically, provided is a boring tool wherein a shaft-like tool body (10) is equipped with cutting bits, and wherein the tool body (10) makes a reciprocating motion, thereby reaming a hole provided to a workpiece to be machined. The tool body (10) is provided with a substrate (11) formed by a carbon fiber reinforced composite material, a hard plating layer (13) consisting of hard plating applied to the surface (10b) of the tool body (10), and a backing layer (12) which is applied between the substrate (11) and the hard plating layer (13) and serves to improve the wettability of the hard plating layer (13).

6 Claims, 8 Drawing Sheets

(52) U.S. Cl.
CPC ......... *B23B2228/10* (2013.01); *B23B 2270/16* (2013.01); *Y10S 408/708* (2013.01)
USPC ..................................... 408/239 R; 408/708

(56) References Cited

U.S. PATENT DOCUMENTS

| | | | |
|---|---|---|---|
| 6,935,816 B2* | 8/2005 | Lee et al. | 408/144 |
| 2004/0191019 A1 | 9/2004 | Lee et al. | |
| 2007/0170176 A1* | 7/2007 | Lee et al. | 219/645 |
| 2008/0292418 A1* | 11/2008 | Kay et al. | 408/238 |
| 2009/0047082 A1* | 2/2009 | Kay | 408/144 |

FOREIGN PATENT DOCUMENTS

| | | | |
|---|---|---|---|
| CN | 101468402 A | | 7/2009 |
| JP | 60-238202 A | | 11/1985 |
| JP | 61-194197 A | | 8/1986 |
| JP | 6-210763 A | | 8/1994 |
| JP | 7-119732 A | | 5/1995 |
| JP | 7-290305 A | | 11/1995 |
| JP | 2001-505133 A | | 4/2001 |
| JP | 2001-527469 A | | 12/2001 |
| JP | 2004-535942 A | | 12/2004 |
| JP | 2005133184 A | * | 5/2005 |
| JP | 2005-199391 A | | 7/2005 |
| JP | 2005232579 A | * | 9/2005 |
| JP | 2010-52069 A | | 3/2010 |
| SU | 1761386 A | | 8/1989 |

OTHER PUBLICATIONS

Notice of Allowance issued Sep. 3, 2013 for related Japaense Patent Application No. 2009-238891 with an English tranalstion.
Chinese Office Action issued Jan. 21, 2014 for corresponding Chinese Application No. 201080046607.3 with an English translation.
Chinese Office Action dated Jul. 1, 2014 for related Chinese Application No. 201080046607.3 and an English Translation.

* cited by examiner

BORING TOOL

TECHNICAL FIELD

This invention relates to a boring tool for rough-machining or finish-machining a hole provided in a workpiece to be machined (may hereinafter be referred to as a workpiece).

BACKGROUND ART

A boring tool is used for the rough machining or finish machining of a hole provided in a workpiece. For example, a line boring bar, which is a type of boring tool, is used when machining a crankshaft hole of a cylinder block of an internal combustion engine. The machining of the crankshaft hole is performed by inserting the line boring bar into the crankshaft hole of the cylinder block, and reciprocating the line boring bar in the axial direction while rotating the line boring bar.

Since the line boring bar makes such a motion, it is required to have both of abrasion resistance and high stiffness. Thus, a tool made of steel has so far been used as the line boring bar. However, a further improvement in the machining accuracy of the tool is desired, and deformation and vibration due to the mass of the boring tool itself are not negligible any longer. Thus, further weight reduction is under consideration. For example, Patent Document 1 discloses a high-stiffness composite material bar. The high-stiffness composite material bar is composed of a cylindrical metal bar produced from a material with high static stiffness; a cylindrical composite material bar connected to one end of the metal bar and produced from a composite material with high specific stiffness or rigidity; and a connecting member surrounding the outer peripheries of the metal bar and the composite material bar.

PRIOR ART DOCUMENTS

Patent Documents

Patent Document 1: JP-T-2004-535942 (see, for example, the paragraphs [0023] to [0029], [FIG. 11], etc.)

SUMMARY OF THE INVENTION

Problems to be Solved by the Invention

The above-mentioned high-stiffness composite material bar is partly composed of the composite material bar. Thus, it is lightweight as compared with a tool entirely composed of steel. However, apart of the high-stiffness composite material bar contains the metal bar. It has been desired, therefore, that the metal bar part be also rendered lightweight.

Under these circumstances, the present invention has been accomplished in an attempt to solve the problems mentioned above. It is an object of the invention to provide a boring tool which not only is lightweight, but also has both abrasion resistance and high stiffness.

Means for Solving the Problems

A boring tool according to the present invention, for solving the aforementioned problems, is a boring tool including a shaft-like tool body equipped with a cutting bit, the tool body making a reciprocating motion in an axial direction to bore a hole provided in a workpiece to be machined, wherein
the tool body is provided with a substrate formed from a carbon fiber reinforced composite material, a hard plating layer consisting of hard plating applied to the surface of the tool body, and a backing layer which is applied between the substrate and the hard plating layer and consists of an undercoat for improving the wettability of the hard plating, or
the tool body is provided with a substrate formed from a carbon fiber reinforced composite material, and a thermal-sprayed coating layer formed by thermal-spraying the surface of the substrate with a hard powder.

A boring tool according to the present invention, for solving the aforementioned problems, is the above-mentioned boring tool, wherein the tool body is formed to be hollow.

A boring tool according to the present invention, for solving the aforementioned problems, is the above-mentioned boring tool, wherein the hard plating is hard chromium plating.

A boring tool according to the present invention, for solving the aforementioned problems, is the above-mentioned boring tool, wherein the undercoat is copper plating, iron plating, or chromium plating.

A boring tool according to the present invention, for solving the aforementioned problems, is the above-mentioned boring tool, wherein the hard powder contains at least one of tungsten carbide (WC), cobalt (Co) and Nickel (Ni).

A boring tool according to the present invention, for solving the aforementioned problems, is the above-mentioned boring tool, wherein
a fixing hole for fixing the cutting bit is provided in the tool body, and
the cutting bit is equipped with a cutting tip for machining the workpiece, a holding implement for holding the cutting tip, and a fixing implement inserted into the fixing hole for fixing the holding implement to the tool body.

Effects of the Invention

Because of the foregoing features, the boring tool according to the present invention not only is lightweight, but also has both abrasion resistance and high stiffness. Thus, the deflection and vibration of the boring tool are suppressed, and high accuracy machining can be performed.

MODE FOR CARRYING OUT THE INVENTION

An embodiment of a boring tool according to the present invention will be described in detail by reference to FIG. 1 to FIGS. 6A to 6C.

Figure 1:
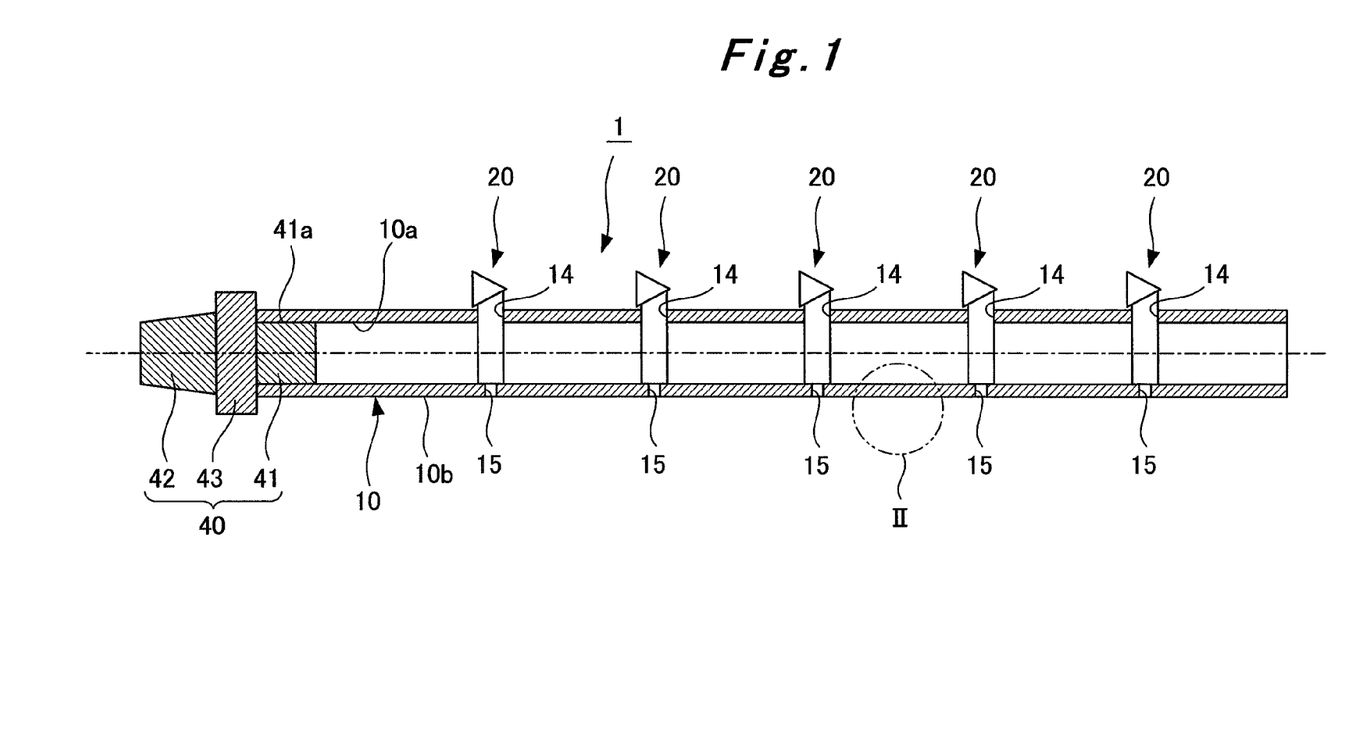
FIG. 1 is a view schematically showing a boring tool according to an embodiment of the present invention.

In the present embodiment, an explanation will be offered for the application of the boring tool of the present invention to a line boring bar which is a type of boring tool. The line boring bar includes a plurality of cutting bits provided on a shaft-like tool body. By rotating the tool body while reciprocating it in the axial direction, a hole provided in a workpiece can be bored. A line boring bar 1 includes a tool body 10 formed in a tubular shape, as shown in FIG. 1. Because of this configuration, it is possible to render the tool body 10 lightweight effectively, without lowering the strength of the tool body 10.

A tool holder 40 is provided at one end of the tool body 10. The tool holder 40 includes a tool support portion 41, a tool fixing portion 42, and a coupling portion 43. The tool support portion 41 is formed to be capable of being fitted into an inner peripheral part 10a of the tool body 10, and an outer peripheral part 41a of the tool support portion 41 and the inner peripheral part 10a of the tool body 10 are fixed together by an adhesive. The tool fixing portion 42 is formed to be mountable on a main spindle head of a machine tool (a boring machine). The tool support portion 41 and the tool fixing portion 42 are coupled together via the coupling portion 43.

In the axial direction (longitudinal direction) of the tool body 10, a plurality of fixing holes 14 for fixing cutting bits 20 are provided in correspondence with holes of a workpiece to be machined by the boring tool, for example, crankshaft holes of a cylinder block. At sites opposing the fixing holes 14, there are provided tool holes 15 into which a rotating tool for rotating an adjusting screw 28 to be described later can be inserted. A stepped part 15a of the tool hole 15 is formed such that it can be fitted with another end of a single-point tool holder 23 to be described later, as shown in FIG. 4.

Figure 3:
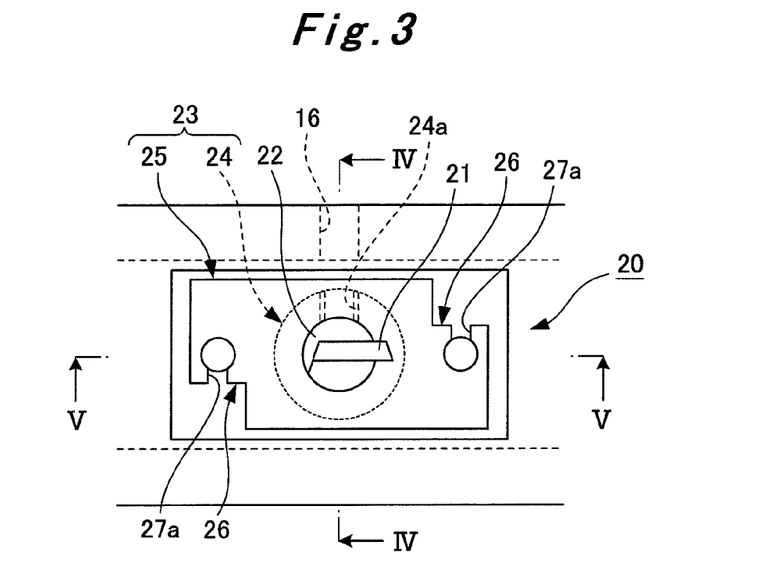
FIG. 3 shows an example of a cutting bit included in the boring tool according to the embodiment of the present invention, as a plan view of a state where the cutting bit is mounted on the boring tool.
Figure 4:
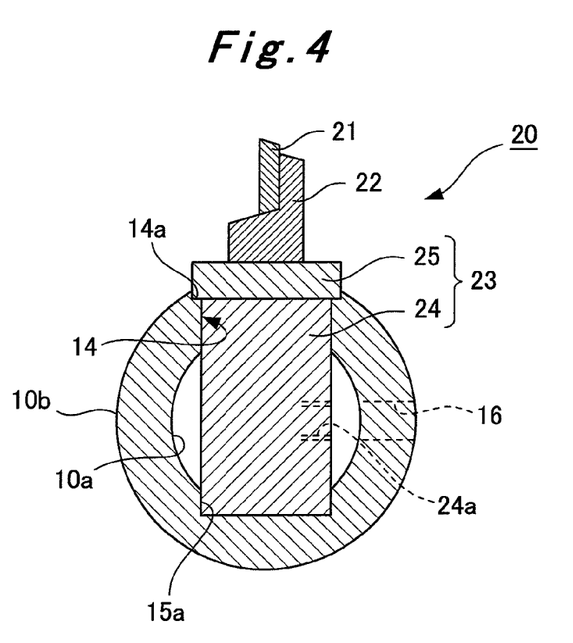
FIG. 4 is a sectional view taken along the arrowed line IV-IV of FIG. 3.
Figure 5:
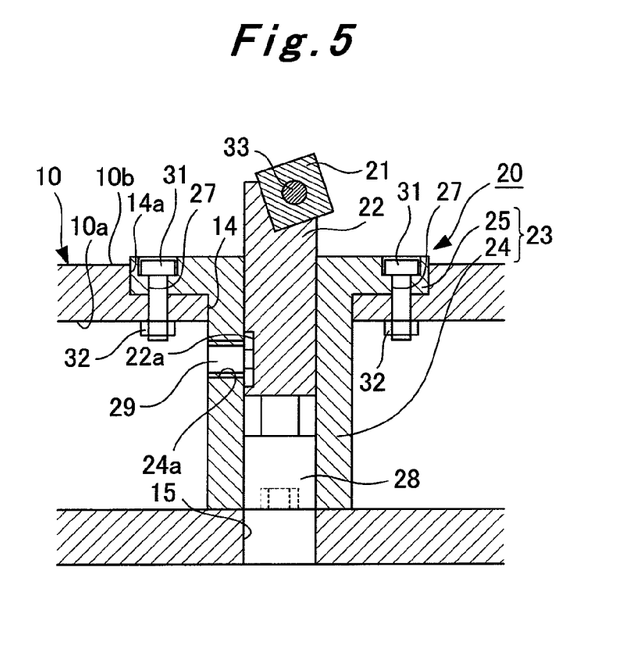
FIG. 5 is a sectional view taken along the arrowed line V-V of FIG. 3.

The cutting bit 20 includes a cutting tip 21, a single-point tool (holding implement) 22, and the single-point tool holder (fixing implement) 23, as shown in FIGS. 3, 4 and 5. The single-point tool holder 23 includes a tubular portion (holding portion) 24, and a flange portion 25 connected to one end of the tubular portion 24.

The cutting tip 21 is detachably fixed to the leading end of the single-point tool 22 by a bolt 33. In the vicinity of the lower end of the single-point tool 22, a slot 22a is formed on which the head of a fixing screw 29 to be described later abuts.

One end side of the tubular portion 24 is formed such that the single-point tool 22 can be inserted into the tubular portion 24. On the other end side of the tubular portion 24, there is formed an internally threaded part (not shown) with which an externally threaded part (not shown) of the adjusting screw 28 (diametrical position adjusting means) can mesh. By rotating the adjusting screw 28 with the use of a rotating tool (not shown), the adjusting screw 28 is moved in the diametrical direction of the tool body 10, whereby the position of the single-point tool 22 is adjusted in the diametrical direction of the tool body 10. As a result, the position of the cutting tip 21 is adjusted in the diametrical direction of the tool body 10. After the position of the cutting tip 21 is adjusted, the tool hole 15 is covered with a lid member (not shown), so that the entry of swarf or the like inside the tool hole 15 is prevented. In the tubular portion 24, a bolt hole 24a is formed which penetrates the inner peripheral wall part and the outer peripheral wall part thereof and which a fixing screw 29 (fixing means) can engage. The single-point tool 22 is fixed to the single-point tool holder 23 by the fixing screw 29.

The flange portion 25 is formed in a nearly rectangular shape. On opposite end sides in the longitudinal direction of the flange portion 25, notched parts 26 and bolt holes 27 are provided. The notched part 26 on the one end side and the notched part 26 on the other end side are provided at locations opposed to each other. The bolt holes 27 provided at the opposite end parts are provided with communicating parts 27a communicating with the notched parts 26. The flange portion 25 is fitted into a stepped part 14a of the fixing hole 14, and fixed to the tool body 10 by bolts 31 and nuts 32. If it is unnecessary to detach the single-point tool holder 23, it is permissible to adhere the tool body 10 and the single-point tool holder 23.

Figure 2:
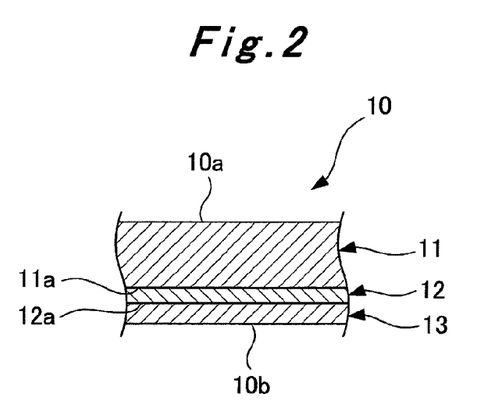
FIG. 2 is an enlarged view of a portion enclosed in a line II in FIG. 1.

The above-described tool body 10 includes a substrate 11, a backing layer 12, and a hard plating layer 13, as shown in FIG. 2. The substrate 11 is prepared from a carbon fiber reinforced composite material (CFRP: Carbon Fiber Reinforced Plastic). Since the substrate 11 is prepared from the CFRP, the line boring bar 1 itself can be rendered lightweight, and its stiffness can be enhanced.

The backing layer 12 consists of an undercoat for improving the wettability of hard plating to be described later, and is provided on the surface 11a of the substrate 11. Examples of the undercoat are copper plating, iron plating, and chromium plating. The plating method for the undercoat includes, for example, conventional plating methods such as electroplating and electroless plating. Because the undercoat is copper plating, iron plating or chromium plating, a marked increase in the manufacturing cost can be curtailed.

The hard plating layer 13 consists of hard plating, and is provided on the surface 12a of the backing layer 12. In other words, the hard plating layer 13 is provided on the surface 10b of the tool body 10. Thus, strength and stiffness which enable the resulting composite to withstand use as the line boring bar (boring tool) 1 are obtained. When the line boring bar 1 is reciprocated in the axial direction, moreover, the line boring bar 1 improves in abrasion resistance to friction against support bushings 55, 56 (to be described later) supporting the line boring bar 1, or to chips or swarf, e.g., swarf caused by the line boring bar 1. Furthermore, the handleability of the line boring bar 1 itself is improved. An example of the hard plating is hard chromium plating. The plating method for the hard plating includes, for example, conventional plating methods such as electroplating and electroless plating. Because the hard plating is hard chromium plating, a marked increase in the manufacturing cost can be curtailed.

The machining of a hole in a workpiece with the use of the above-mentioned line boring bar will be described concretely by reference to FIGS. 6A, 6B and 6C.

First, the holder 42 of the line boring bar 1 is fixed to a main spindle head 51 of a boring machine. As an example of the workpiece, a cylinder block 52 of an internal combustion engine is fixed to a table 54. Ahead and behind the table 54, the support bushings 55 and 56 are disposed, respectively. The support bushings 55, 56 comprise inner tubes 55a, 56a and outer tubes 55b, 56b, and the inner tubes 55a, 56a are supported by the outer tubes 55b, 56b via bearings 55c, 56c so as to be rotatable about the shaft.

Figure 6A:
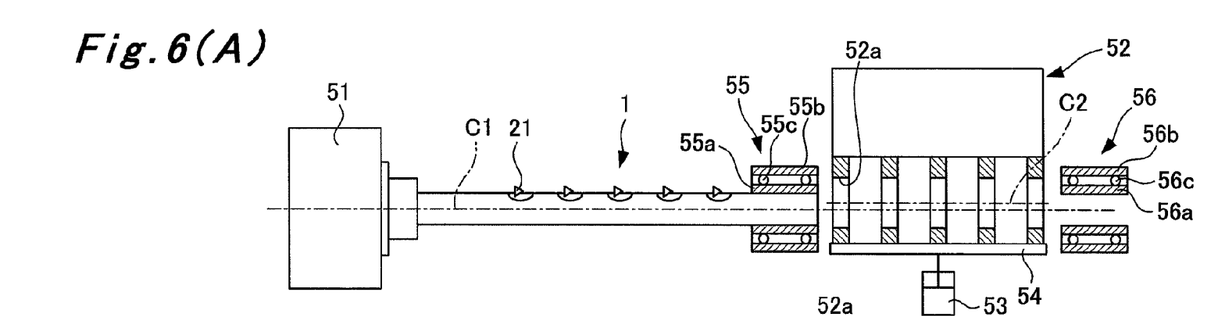
FIGS. 6A to 6C are views for illustrating an example of a machining procedure for a workpiece by the boring tool according to the embodiment of the present invention.

Then, as shown in FIG. 6A, the table 54 is moved upward and downward by a cylinder 53 to offset the central axis C1 of the line boring bar 1 and the central axis C2 of crankshaft holes 52a from each other in the up-and-down direction.

Figure 6B:
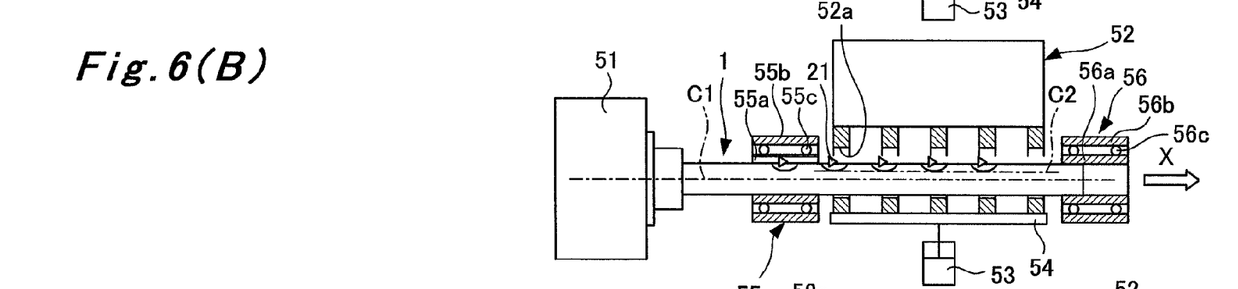

Then, as indicated by an arrow X in FIG. 6B, the line boring bar 1 is inserted into the crankshaft hole 52a. In inserting the line boring bar 1 into the crankshaft hole 52a, as seen here, the central axis C1 of the line boring bar 1 and the central axis C2 of the crankshaft hole 52a are offset from each other in the up-and-down direction. Thus, the line boring bar 1 can be inserted into the crankshaft hole 52a, with the cutting tip 21 of the line boring bar 1 out of contact with the crankshaft hole 52a.

Figure 6C:
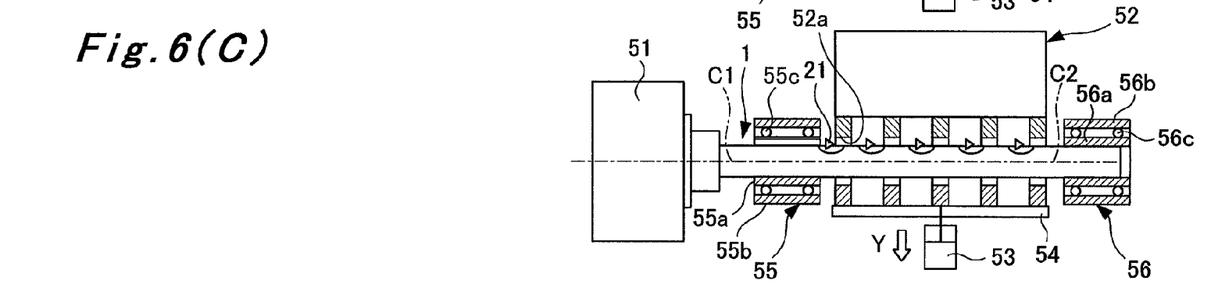

Then, as indicated by an arrow Y in FIG. 6C, the table 54 is moved upward and downward by the cylinder 53 to bring the central axis C1 of the line boring bar 1 and the central axis C2 of the crankshaft hole 52a into conformity. In this state, the line boring bar 1 is reciprocated in its axial direction while being rotated, whereby machining is applied to the crankshaft holes 52a.

According to the boring tool concerned with the present embodiment, as noted above, the tool body 10 is provided with the substrate 11 formed by the carbon fiber reinforced composite material, the hard plating layer 13 formed on the surface 10b of the tool body 10, and the backing layer 12 formed between the substrate 11 and the hard plating layer 13. Since the tool body 10 itself is formed of the carbon fiber reinforced composite material, it is lightweight. Because the hard plating layer 13 is provided on the surface 10b of the tool body 10, moreover, the tool body 10 has both abrasion resistance and high stiffness. Hence, the deflection and vibration of the boring tool are suppressed, so that high accuracy machining can be performed.

Since the cutting bit 20 includes the cutting tip 21, the single-point tool 22, and the single-point tool holder 23, the cutting bit 20 can be easily fixed to the tool body 10, although the substrate 11 of the tool body 10 is the carbon fiber reinforced composite material.

Figure 7:
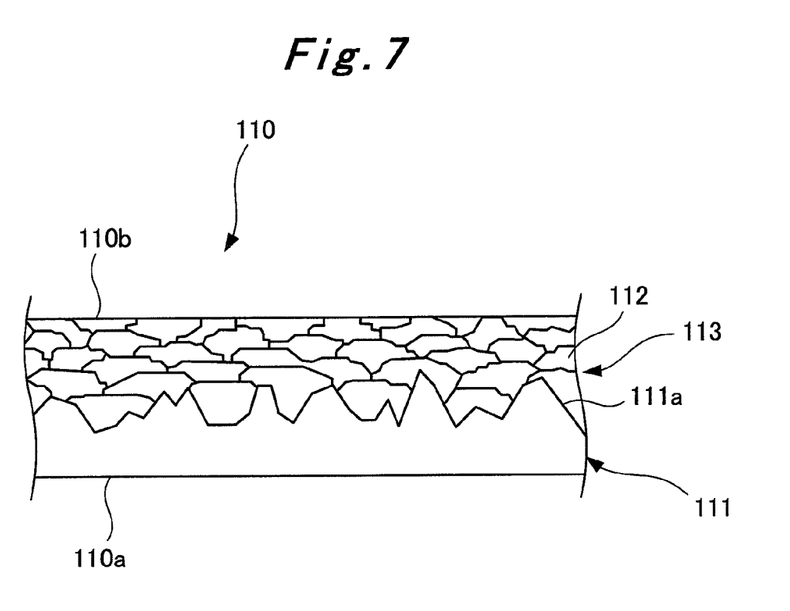
FIG. 7 is a view schematically showing the section of a tool body of a boring tool according to another embodiment of the present invention.

In the above descriptions, the tool body 10 having the backing layer 12 applied between the substrate 11 and the hard plating layer 13 has been described as applied to the line boring bar 1 (boring tool). As shown, for example, in FIG. 7, however, a tool body 110 provided with a substrate 111 formed from a carbon fiber reinforced composite material (CFRP), and a thermal-sprayed coating layer 113 formed by thermal-spraying the surface 111a of the substrate 111 with thermal spray hard particles (hard powder) 112 can be applied to a line boring bar (boring tool). That is, the tool body 110 having the substrate 111 disposed on the side of an inner peripheral part 110a of the tool body 110 and the thermal-sprayed coating layer 113 disposed on the side of the surface 110b of the tool body 110 can be applied to the line boring bar. Even such a line boring bar exhibits the same actions and effects as those of the aforementioned line boring bar 1. As the above-mentioned thermal spray hard particles, there can be named those containing at least one of tungsten carbide (WC), cobalt (Co) and Nickel (Ni). The use of such thermal spray hard particles results in increased abrasion resistance to friction against the support bushing for support of the line boring bar, and to swarf, for example, swarf caused by the line boring bar.

Figure 8:
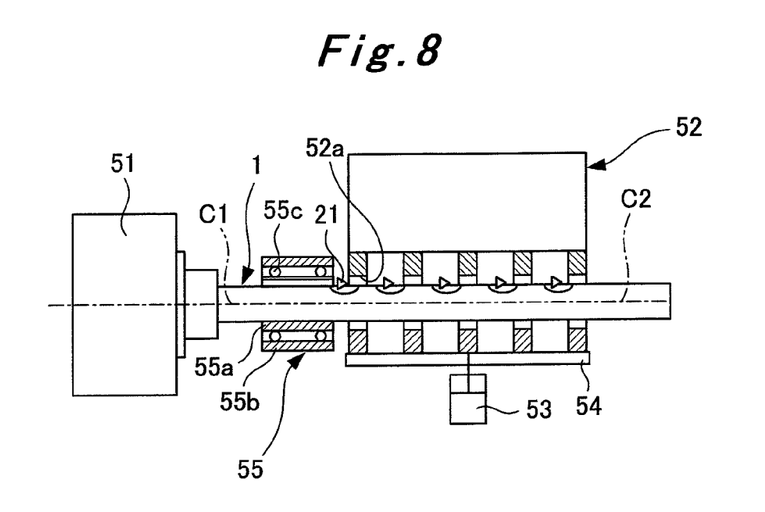
FIG. 8 is a view showing another example of a support bushing for supporting the boring tool according to the embodiment of the present invention.

In the above descriptions, the rotatable support of the line boring bar 1 by the two support bushings 55, 56 has been described. As shown in FIG. 8, however, the line boring bar 1 can be rotatably supported by a single support bushing 55.

In the above descriptions, the support bushings 55, 56 have been described using rotating support bushings (rolling bearings) which have the bearings 55c, 56c arranged between the inner tubes 55a, 56a and the outer tubes 55b, 56b for rotatably supporting the inner tubes 55a, 56a. However, sliding support bushings (sliding bearings) can also be used.

In the above descriptions, the boring tool has been described as applied to the line boring bar 1. However, a reamer having a single cutting bit provided at one end of the tool body, or a boring tool without a support bushing may be applied as the boring tool of the present invention. Even the reamer, or the boring tool without the support bushing, applied as the boring tool, exhibits the same actions and effects as those of the aforementioned boring tool.

INDUSTRIAL APPLICABILITY

The boring tool according to the present invention not only is lightweight, but also has both abrasion resistance and high stiffness. Thus, the deflection and vibration of the tool are suppressed, and high accuracy machining can be performed. Consequently, the boring tool is useful in the machine tool industry. Furthermore, weight reduction of the tool downsizes or simplifies means for transport and conveyance of the tool, such as an automatic tool changer. Thus, the effect of cost reduction for the entire machine is great.

EXPLANATIONS OF LETTERS OR NUMERALS

1 Line boring bar
10 Tool body
11 Substrate
12 Backing layer
13 Hard plating layer
20 Cutting bit
21 Cutting tip
22 Single-point tool
23 Single-point tool holder
24 Tubular portion
25 Flange portion
26 Notched part
27 Bolt hole
28 Adjusting screw
29 Fixing screw
51 Main spindle head
52 Cylinder block
53 Cylinder
54 Table
55, 56 Support bushing
110 Tool body
111 Substrate
112 Thermal spray hard particles
113 Thermal-sprayed coating layer

The invention claimed is:

1. A boring tool including a shaft-like tool body equipped with a cutting bit, the tool body making a reciprocating motion in an axial direction to bore a hole provided in a workpiece to be machined, wherein
the tool body is provided with a substrate formed from a carbon fiber reinforced composite material, a hard plating layer consisting of hard plating applied to a surface of the tool body, and a backing layer which is applied between the substrate and the hard plating layer and consists of an undercoat for improving wettability of the hard plating, or
the tool body is provided with a substrate formed from a carbon fiber reinforced composite material, and a thermal-sprayed coating layer formed by thermal-spraying the surface of the tool body with a hard powder.

2. The boring tool according to claim 1, wherein the tool body is formed to be hollow.

3. The boring tool according to claim 1, wherein the hard plating is hard chromium plating.

4. The boring tool according to claim 1, wherein the undercoat is copper plating, iron plating, or chromium plating.

5. The boring tool according to claim 1, wherein the hard powder contains at least one of tungsten carbide (WC), cobalt (Co) and Nickel (Ni).

6. The boring tool according to claim 1, wherein
a fixing hole for fixing the cutting bit is provided in the tool body, and
the cutting bit is equipped with a cutting tip for machining the workpiece, a holding implement for holding the cutting tip, and a fixing implement inserted into the fixing hole for fixing the holding implement to the tool body.

\* \* \* \* \*